Dec. 22, 1959    M. S. CARMICHAEL, JR., ET AL    2,918,292
LEVELING DEVICE FOR MOBILE VINER

Filed Sept. 7, 1955    3 Sheets-Sheet 1

INVENTORS
MEAD S. CARMICHAEL JR.
BY ROBERT A. STARK

Schmieding and Fultz
ATTORNEYS

Dec. 22, 1959  M. S. CARMICHAEL, JR., ET AL  2,918,292
LEVELING DEVICE FOR MOBILE VINER

Filed Sept. 7, 1955  3 Sheets-Sheet 2

INVENTORS
MEAD S. CARMICHAEL JR.
BY ROBERT A. STARK

Schmieding and Fultz
ATTORNEYS

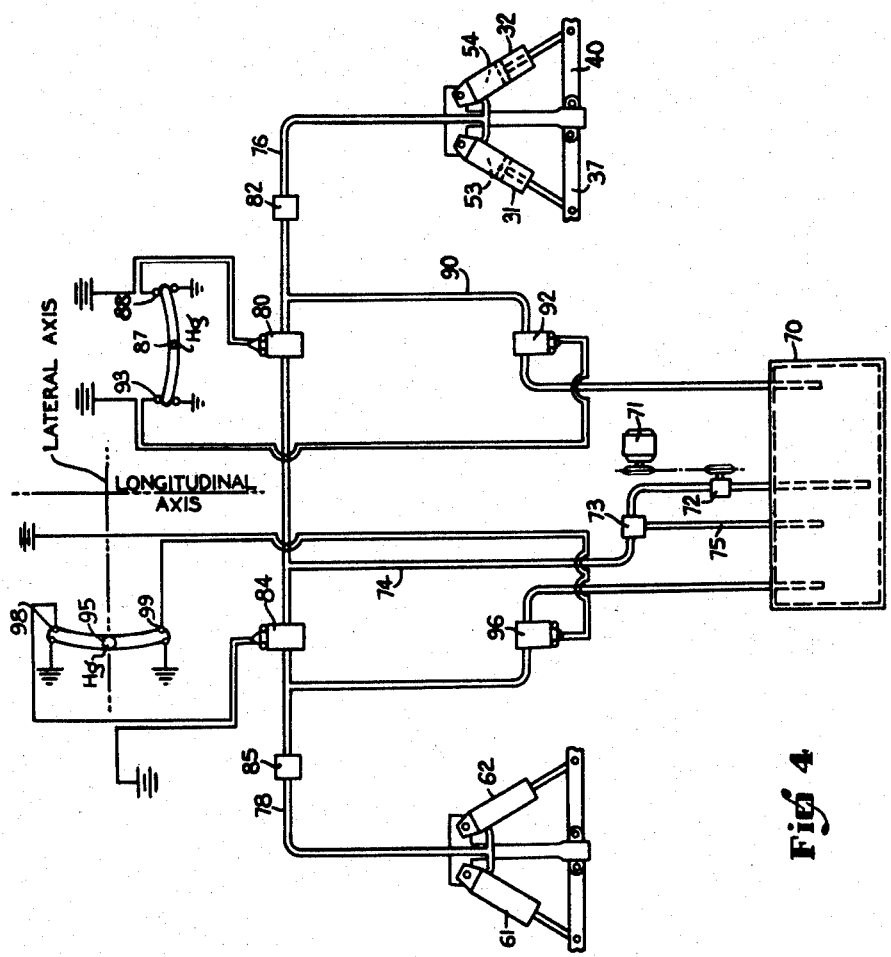

United States Patent Office 2,918,292
Patented Dec. 22, 1959

2,918,292

LEVELING DEVICE FOR MOBILE VINER

Mead S. Carmichael, Jr., and Robert A. Stark, Columbus, Ohio, assignors to The Scott Viner Company, Columbus, Ohio, a corporation of Ohio Application September 7, 1955, Serial No. 532,836

6 Claims. (Cl. 280—6)

The present invention relates to an improved harvester and, more particularly to a viner for separating peas, beans, or similar products from the vines and pods.

The present invention is particularly adaptable to viners operating on the impact principle wherein the vines are fed into the end of a rotating screen covered drum. A beater cylinder is rotated within the screen covered drum, and a series of beaters are mounted on the outer periphery of the beater cylinder. When the beaters strike the pods, such pods are opened by impact and the crop, such as peas or beans, falls downwardly through the screen covered drum to the surface of a separating apron, or inclined conveyor. The crop will then roll downwardly to a collecting means and the small particles of vines and pods will be carried upwardly by the conveyor so as to be separated from the crop.

In viners of this general type it is necessary to maintain the crop separating apparatus level since the effectiveness of the inclined crop separating apron is a function of the angle of inclination of such apron relative to the horizontal. When the viner is of the stationary type this of course presents no problem, but in the case of mobile viners which are drawn through a field, it becomes necessary to continuously maintain the viner frame, and hence the crop separating apparatus, in a level position in order to achieve efficient separation of the crop from the particles of pod and vine.

It is therefore an object of the present invention to provide a viner of the type described which includes improved leveling mechanism for continuously maintaining the frame of the machine in a level position during mobile operation of the viner.

It is another object of the present invention to provide mechanism of the type described wherein two multiple-wheel supporting units are provided for supporting a viner, with one unit on each side of the frame. Each unit is arranged to maintain its respective frame side at the proper height independently of differences in heights of the wheels of said unit, one above the other, caused by said wheels encountering uneven ground surface conditions.

It is another object of the present invention to provide a viner of the type described which includes multiple-wheel supporting units connected to the frame by leveling mechanism adapted to distribute the load equally between the respective wheels of each multiple-wheel supporting unit when such wheels encounter uneven ground surface conditions.

Further objects and advantages of the present invention will be apparent from the following description, reference being had to the accompanying drawings wherein a preferred form of embodiment of the invention is clearly shown.

In the drawings:

Figure 4 is a diagrammatic view showing a control means constructed according to the present invention.

Figure 1:
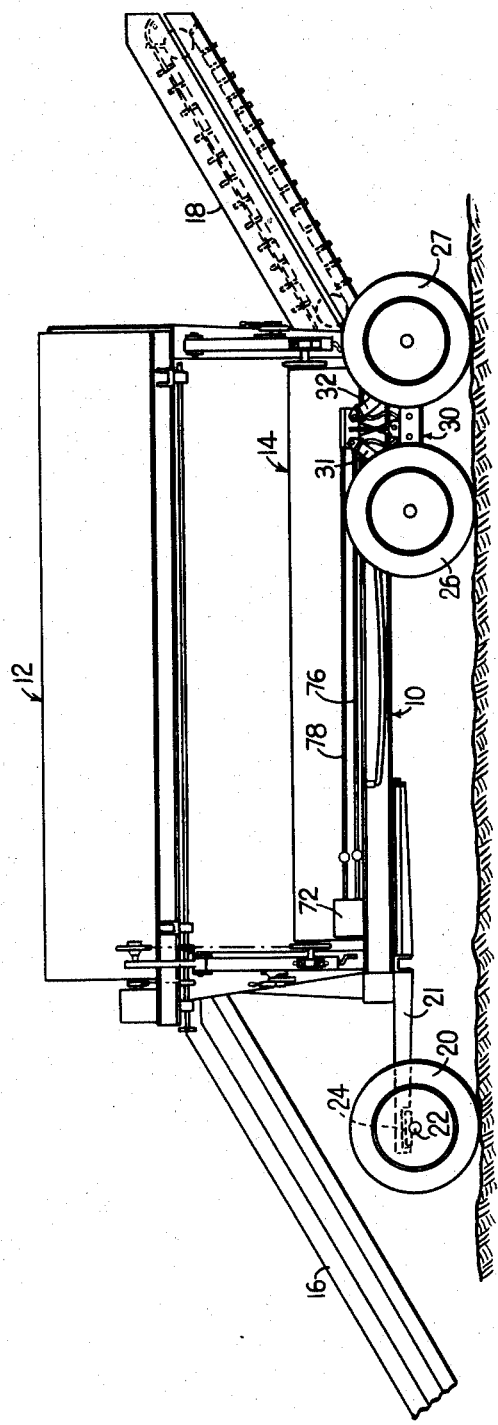
Figure 1 is a side elevational view of a viner provided with the leveling mechanism of the present invention.

Referring to Figure 1 of the drawing, the viner illustrated includes a frame 10 which supports crop hulling apparatus indicated generally at 12. A crop separating apparatus, formed as an inclined moving apron on which the crop and particles of hull and vine are dropped, is indicated generally at 14.

The machine also includes an inclined conveyor 16 arranged to feed vines bearing the crop into the front end of the hulling apparatus 12, and a conveyor 18 for carrying away the vines after the crop has been removed from the hulls in the hulling apparatus 12.

The front end of the viner is provided with a pair of supporting wheels one of which is seen at 20 in Figure 1. The forward frame member 21 is connected to an axle 22 with a suitable universal joint connection 24. With such universal joint the viner frame 10 can be both pitched and rolled relative to the front supporting wheels 20.

With continued reference to Figure 1, the rear of the viner is provided with a left pair of supporting wheels and a right pair. The former are seen at 26 and 27 in Figure 1, the latter being hidden from view.

Figure 2:
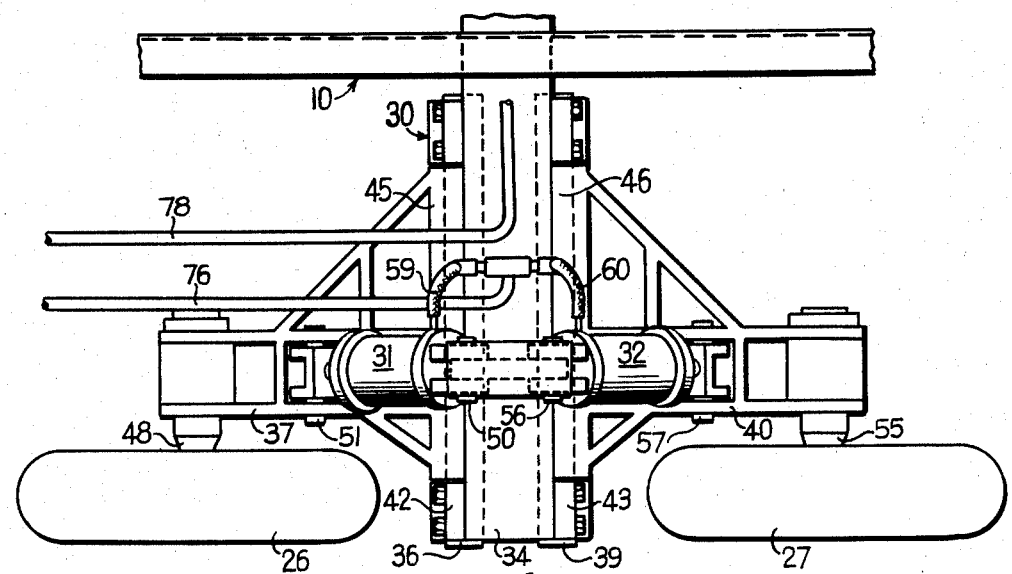
Figure 2 is plan view of one of the multiple-wheel supporting units of the leveling mechanism of Figure 1.
Figure 3:
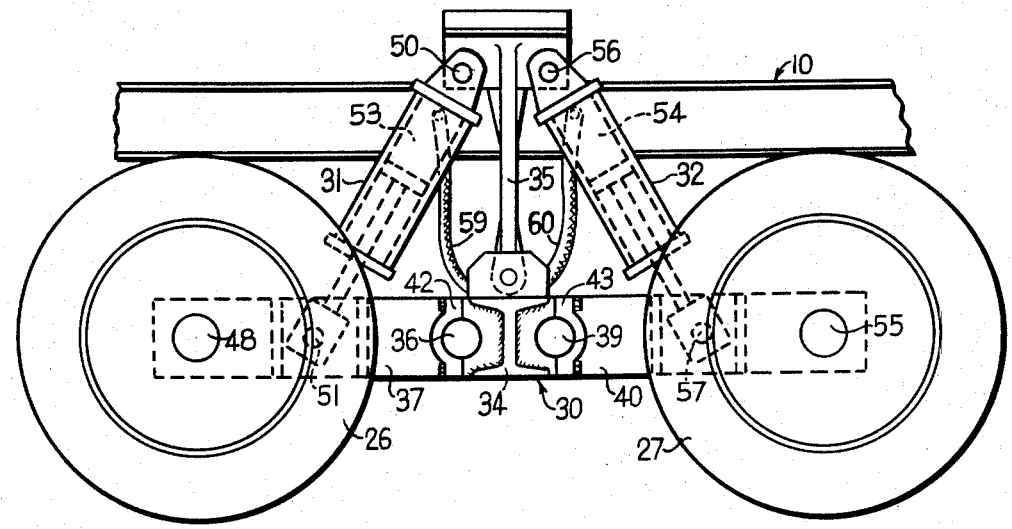
Figure 3 is side elevational view of the multiple-wheel supporting unit of Figure 2.

Each pair of rear wheels is provided with an extendable and retractable mounting means indicated generally at 30 in Figures 1, 2, and 3. Figures 2 and 3 are enlarged views showing one of the mounting means 30 which includes two hydraulic cylinders 31 and 32.

The mounting means 30 is formed by a heavy transverse structural member 34 joined to frame 10 by vertical members 35. Structural member 34 carries a shaft 36 which forms a pivot for movement of arm 37 in a vertical plane. Similarly, shaft 39 forms a pivot for movement of arm 40 in a vertical plane.

The ends of shaft 36 are secured to member 34 by blocks 42 and the ends of shaft 39 are secured to the other side of such member by blocks 43.

The inner ends of arms 37 and 40 are provided with bearings 45 and 46 which pivotally attach the arms to the shafts 36 and 39 respectively.

The outer end of arm 37 carries an axle 48 for wheel 26 and hydraulic cylinder 31 has its upper end pivotally attached to frame 10 at 50 and its lower end pivoted to arm 37 at 51. When pressurized fluid is introduced into upper chamber 53 of cylinder 31 the frame 10 will be raised relative to wheel 26.

In a similar manner the outer end of arm 40 carries an axle 55 for wheel 27 and hydraulic cylinder 32 has its upper end pivotally mounted on frame 10 at 56 and its lower end pivoted to arm 40 at 57. When pressurized fluid is introduced into upper chamber 54 of cylinder 32 the frame 10 is raised relative to wheel 27.

When pressurized fluid is expelled from chambers 53 and 54 the frame 10 is of course lowered relative to the wheels.

As is best seen in Figure 2, the upper chambers 53 and 54 of the two hydraulic cylinders 31 and 32 are connected to common line 76 by the lines 59 and 60. The common line 76 leads to source of pressurized fluid indicated generally at 72 in Figure 1. A separate line 78, Figure 2, leads from the source of pressurized fluid 72 to a second pair of hydraulic cylinders 61 and 62 mounted on the other side of the viner frame and schematically illustrated in the circuit diagram of Figure 4.

Due to the common connection of chambers 53 and 54, the pressures in such chambers will always be equal, and, as a result, wheel 26 will always be subjected to the same load as the wheel 27. Such equal pressure condition, and the resulting equal load distribution between the two wheels, will be maintained for all relative levels between the two wheels. When one wheel encounters a protrusion it will rise to a higher position than the other wheel but both wheels will continue to support equal portions of the total load. The same is true when a depression in the ground surface is encountered.

Referring next to Figure 4, a schematic view of a suitable system for actuating and controlling the power cylinders is shown. A reservoir of hydraulic fluid is indicated at 70. A pump 72 and a relief valve 73 are located along an outlet line 74, which line forms a T-connection with a line 76 extending to power cylinders 31 and 32 and with a second line 78 extending to power cylinders 61 and 62. A solenoid operated valve 80 and a metering valve 82 are located along the line 76 which leads to the power cylinders 31 and 32. Similarly, a solenoid operated valve 84 and the metering valve 85 are located along line 78 leading to the other power cylinders 61 and 62. A mercury switch 87, having a contact 88 connected to the solenoid operated valve 80, serves to open the line 76, upon actuation of the solenoid operated valve 80, thereby admitting the passage of fluid from the pump 72, through the line 76, to the power cylinders 31 and 32. To reverse the flow of fluid, from the hydraulic cylinders 31 and 32 back to reservoir 70, a return line 90 leads from the line 76, through a solenoid operated valve 92 to the reservoir 70. Referring again to the mercury switch 87, it will be seen that when the mercury contacts the contact 93 of the switch, the solenoid operated valve 92 will be actuated, thereby opening the return line 90 to allow the hydraulic fluid to pass from the power cylinders 31 and 32 back to the reservoir 70. A second mercury switch 95 serves in a similar manner to control the opening and closing of the solenoid valves 84 and 96, thereby controlling the flow of hydraulic fluid from the reservoir 70 to the power cylinders 61 and 62, and from such cylinders back to the reservoir 70. The mercury switch 95 is provided with contacts 98 and 99.

In considering the operation of the control apparatus just described it should be understood that one of the mercury switches 87 and 95 is longitudinally disposed in a direction parallel to the longitudinal axis of the viner, and the other of the mercury switches is disposed in a direction transverse to the longitudinal axis of the viner. Hence it will be seen that with the hydraulic and electrical hookup just described, the left pair of power cylinders 31 and 32 and the right pair of power cylinders 61 and 62 can be actuated independently in either direction, or simultaneously in a common direction, or simultaneously in opposite directions. It therefore follows that with the mounting mechanism for the viner frame on the wheel means, as previously described herein, which mechanism is actuated by the control system and the power cylinders just described, the viner can either by rolled about a longitudinal axis, pitched about a latter axis, or pitched and rolled about both of said axes simultaneously. Hence when the viner progresses over a portion of unlevel ground, mercury will flow, from the central non-contacting switch position into contact with certain of the contacts 88, 93, 98, or 99. Electrical impulses will be sent to certain solenoid valve or valves, and hydraulic fluid will be admitted to the power cylinder or power cylinders necessary to raise or lower portions of the viner frame to a level position.

From the foregoing description it will be seen that the present invention provides an improved pea viner on which the vining mechanism is maintained in level disposition, relative to the frame and wheels, when such viner is operating over unlevel ground. Hence the crop separating aprons are maintained at substantially constant angles of inclination so that efficient separation is constantly maintained in separating the crop from particles of pods and vines. Moreover, the novel multiple-wheel supporting mechanism is arranged to maintain equal load distribution on each of the multiple wheels when uneven ground surface conditions are encountered.

While the form of embodiment of the present invention as herein disclosed constitutes a preferred form, it is to be understood that other forms might be adopted, all coming within the scope of the claims which follow.

We claim:

1. In a mobile viner of the type comprising a main frame which supports apparatus for hulling the crop and separating the crop from particles of hulls and stalks, improved leveling mechanism for maintaining said apparatus level when the apparatus encounters uneven ground conditions, which mechanism comprises first wheel means including a pair of longitudinally spaced wheels on one side of the viner; a fluid motor including a cylinder and ram connected between one of said pair of wheels and said frame for varying the distance therebetween, a second fluid motor including a cylinder and ram connected between the other of said pair of wheels and said frame for varying the distance therebetween; second wheel means including a pair of longitudinally spaced wheels on the opposite side of the viner parallelly positioned with respect to said first wheel means, a fluid motor including a cylinder and a ram connected between one of said second pair of wheels and said frame for varying the distance therebetween, a fluid motor including a cylinder and ram connected between the other of said second pair of wheels and said frame for varying the distance therebetween, a pump, first conduit means connecting the pump with the first and second cylinders, return conduit means connecting said first and second cylinders to said pump, conduit means connecting the pump with the third and fourth cylinders, return conduit means connecting said third and fourth cylinders to said pump, valve means in the first and second conduit means controlling the flow of fluid, said valve means when in a selected position simultaneously controlling the flow of fluid to the first and second cylinders, and from the third and fourth cylinders, and when in another selected position simultaneously controlling the flow of fluid from the first and second cylinders and to the third and fourth cylinders, third wheel means on one side of said viner, fourth wheel means parallelly arranged with respect to said third wheel means and on the opposite side of the viner thereof, said third and fourth wheel means being longitudinally spaced from said first and second wheel means respectively, a first level movable in response to variation in levels between the first and second wheel means and means responsive to the movement of the first level for controlling the valve means in the first conduit means.

2. A mechanism in accordance with claim 1 including a second level movable in response to variations in levels between either of the first two mentioned wheel means and the third and fourth wheel means, and means responsive to the movement of the second level for controlling the valve means in the second conduit means.

3. In a mobile viner of the type comprising a main frame which supports apparatus for hulling the crop and separating the crop from particles of hulls and stalks, improved leveling mechanism for maintaining said apparatus level when the apparatus encounters uneven ground conditions, which mechanism comprises first wheel means including a pair of longitudinally spaced wheels on one side of the viner; a fluid motor including a cylinder and ram connected between one of said pair of wheels and said frame for varying the distance therebetween, a second fluid motor including a cylinder and ram connected between the other of said pair of wheels and said frame for varying the distance therebetween; second wheel means including a pair of longitudinally spaced wheels on the opposite side of the viner parallelly positioned with respect to said first wheel means, a fluid motor including a cylinder and a ram connected between one of said second pair of wheels and said frame for varying the distance therebetween, a fluid motor including a cylinder and ram connected between the other of said second pair of wheels and said frame for varying the distance therebetween, a pump, first conduit means connecting the pump with the first and second cylinders, return conduit means connecting said first and second cylinders to said pump, conduit means connecting the pump with the third and fourth cylinders, return conduit means connecting said third and fourth cylinders to said pump, valve means in the first and second conduit means controlling the flow of fluid, said valve means when in a selected position simultaneously controlling the flow of fluid to the first and second cylinders, and from the third and fourth cylinders, and when in another selected position simultaneously controlling the flow of fluid from the first and second cylinders and to the third and fourth cylinders, third wheel means on one side of said viner, fourth wheel means parallelly arranged with respect to said third wheel means and on the opposite side of the viner thereof, said third and fourth wheel means being longitudinally spaced from said first and second wheel means respectively, a first level movable in response to variation in levels between the first and second wheel means, means responsive to the movement of the first level for controlling the valve means in the first conduit means, a second level movable in response to variations in levels between either of the two mentioned wheel means and the third and fourth wheel means, and means responsive to the movement of the second level for controlling the valve means in the second conduit means.

4. In a mobile viner of the type comprising a main frame which supports apparatus for hulling the crop and separating the crop from particles of hulls and stalks, improved leveling mechanism for maintaining said apparatus level when the wheels of the viner encounter uneven ground conditions, which mechanism comprises first wheel means including a pair of longitudinally spaced wheels on one side of said viner, a fluid motor including cylinder and ram connected between one of said pair of wheels and the main frame for varying the distance therebetween, a second fluid motor including a cylinder and ram connected between the other of said pair of wheels and the main frame for varying the distance therebetween, a pump, first conduit means connecting the pump with both of said cylinders, return conduit means connecting both of said cylinders to said pump, valve means in the first conduit means for controlling the flow of fluid, said valve means when in a selected position simultaneously controlling the flow of fluid to both of said cylinders, and when in another selected position simultaneously controlling the flow of fluid from both of said cylinders, second wheel means including a second pair of wheels parallelly arranged with respect to said first wheel means and on the opposite side of the viner thereof, third wheel means on one side of said viner, fourth wheel means parallelly arranged with respect to said third wheel means and on the opposite side of the viner thereof, said third and fourth wheel means being longitudinally spaced from and on the same side of the viner as the one of said third and fourth wheel means, and means responsive to the movement for controlling the valve means.

5. In a mobile viner of the type comprising a main frame which supports apparatus for hulling the crop and separating the crop from particles of hulls and stalks, improved leveling mechanism for maintaining said apparatus level when the wheels of the viner encounter uneven ground conditions, which mechanism comprises first wheel means including a pair of longitudinally spaced wheels on one side of said viner, a fluid motor including cylinder and ram connected between one of said pair of wheels and the main frame for varying the distance therebetween, a second fluid motor including a cylinder and ram connected between the other of said pair of wheels and the main frame for varying the distance therebetween, a pump, first conduit means connecting the pump with both of said cylinders, return conduit means connecting both of said cylinders to said pump, valve means in the first conduit means for controlling the flow of fluid, said valve means when in a selected position simultaneously controlling the flow of fluid to both of said cylinders, and when in another selected position simultaneously controlling the flow of fluid from both of said cylinders, second wheel means including a second pair of wheels parallelly arranged with respect to said first wheel means and on the opposite side of the viner thereof, third wheel means on one side of said viner, fourth wheel means parallelly arranged with respect to said third wheel means and on the opposite side of the viner thereof, said third and fourth wheel means being longitudinally spaced from said first and second wheel means respectively, a level movable in response to variations in levels between one of said first and third wheel means and one of said second and fourth wheel means, the one of said first and third wheel means in coaction with the one of said second and fourth wheel means being parallelly aligned with one another on opposite sides of said viner, and means responsive to the movement for controlling the valve means.

6. In a mobile viner of the type comprising a main frame which supports apparatus for hulling the crop and separating the crop from particles of hulls and stalks, improved leveling mechanism for maintaining said apparatus level when the apparatus encounters uneven ground conditions, which mechanism comprises first wheel means including a pair of longitudinally spaced wheels on one side of the viner, a fluid motor including a cylinder and ram connected between one of said pair of wheels and said frame for varying the distance therebetween, a second fluid motor including a cylinder and ram connected between the other of said pair of wheels and said frame for varying the distance therebetween, second wheel means including a pair of longitudinally spaced wheels on the opposite sde of the viner parallelly positioned with respect to said first wheel means, a fluid motor including a cylinder and a ram connected between one of said second pair of wheels and said frame for varying the distance therebetween, a fluid motor including a cylinder and ram connected between the other of said second pair of wheels and said frame for varying the distance therebetween, a pump, first conduit means connecting the pump with the first and second cylinders, return conduit means connecting said first and second cylinders to said pump, second conduit means connecting the pump with the third and fourth cylinders, return conduit means connecting said third and fourth cylinders to said pump, valve means in the first and second conduit means controlling the flow of fluid, said valve means when in a selected position simultaneously controlling the flow of fluid to the first and second cylinders, and when in another selected postion simultaneously controlling the flow of fluid from the first and second cylinders and to the third and fourth cylinders, third wheel means on one side of said viner, fourth wheel means parallelly arranged with respect to said third wheel means and on the opposite side of the viner thereof, said third and fourth wheel means being longitudinally spaced from said first and second wheel means respectively, a first level movable in response to variations in levels between one of said first and second wheel means and one of said third and fourth wheel means, the one of said first and second wheels in coaction with the one of said third and fourth wheels being longitudinally spaced from and on the same side of the viner as the one of said third and fourth wheel means, means responsive to the movement for controlling the valve means in the first conduit means, a second level movable in response to variations in levels between one of said first and third wheel means and one of said second and fourth wheel means, the one of said first and third wheel means in coaction with the one of said second and fourth wheel means being parallelly aligned with one another on opposite sides of said viner, and means responsive to the movement for controlling the valve means in the second conduit means.

References Cited in the file of this patent

UNITED STATES PATENTS

| | | |
|---|---|---|
| 2,202,009 | Knox | May 28, 1940 |
| 2,519,002 | Stemen | Aug. 15, 1950 |
| 2,656,194 | Saulsbury | Oct. 20, 1953 |